Jan. 5, 1954  J. C. MILLER  2,664,857
PIG CASTRATING HOLDER
Filed Dec. 14, 1951
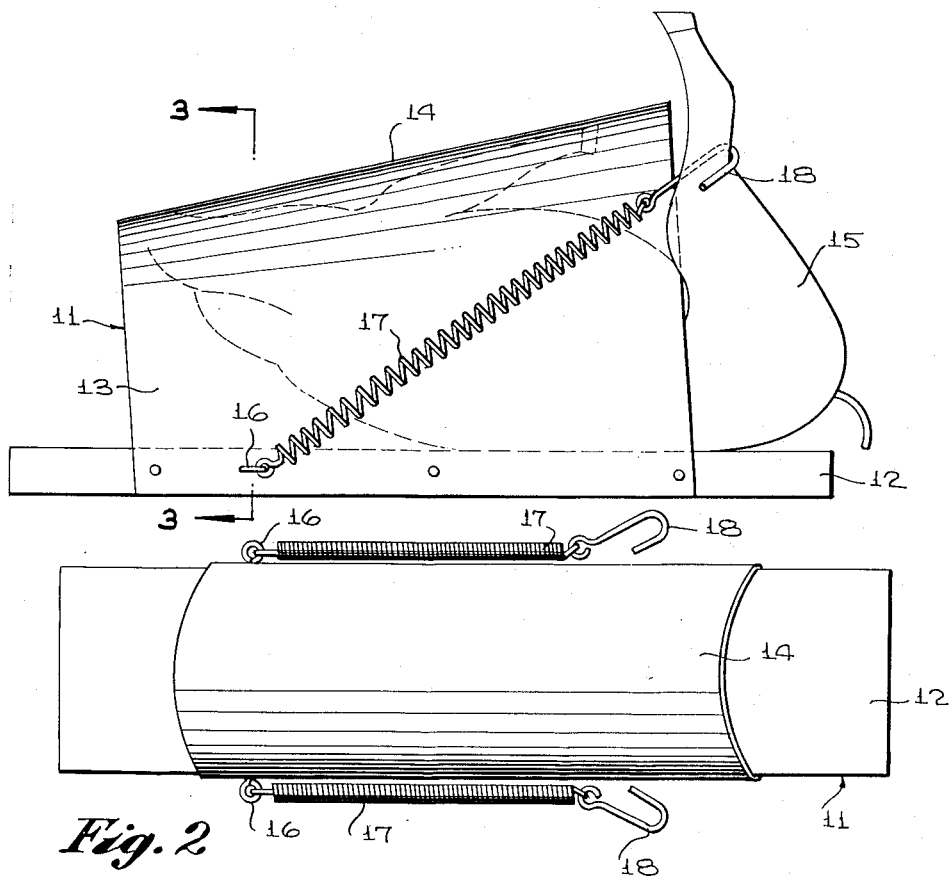
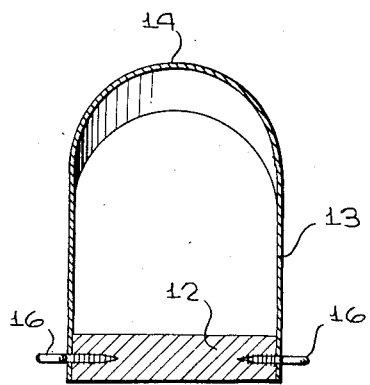
INVENTOR.
BY JACK C. MILLER
McMorrow, Berman + Davidson
ATTORNEYS Patented Jan. 5, 1954

2,664,857

UNITED STATES PATENT OFFICE 2,664,857

PIG CASTRATING HOLDER

Jack C. Miller, New Sharon, Iowa

Application December 14, 1951, Serial No. 261,645

2 Claims. (Cl. 119—103)

1

This invention relates to animal-restraining devices, and more particularly to a holder adapted to retain an animal during the castration thereof.

A main object of the invention is to provide a novel and improved animal retainer which is simple in construction, which is easy to use, and which provides effective securement of a pig or other similar animal during the process of castration thereof.

A further object of the invention is to provide an improved animal holder which is inexpensive to manufacture, which is rugged in construction, and which is compact in size.

Further objects and advantages of the invention will become apparent from the following description and claims, and from the accompanying drawings, wherein:

Figure 1 is a side elevational view of an improved animal-restraining device constructed in accordance with the present invention, showing a pig held in the device;

Figure 2 is a top plan view of the animal-restraining device of Figure 1;

Figure 3 is a cross-sectional view taken on the line 3—3 of Figure 1.

Referring to the drawings, the improved animal-restraining device is shown generally at 11 and comprises an elongated rectangular baseboard 12 on which is secured a tunnel-like hood 13 of sheet metal or other similar suitable rigid sheet material, the hood member 13 being open at both ends and having a sloping top wall 14, whereby a pig, designated at 15, may be received under the hood member 13 with its back on the baseboard 12 in the manner illustrated in Figure 1, with its rear portion exposed through the larger end of said hood member. Secured to the side edges of the baseboard 12 and extending through the lower marginal side portions of the hood member 14 are the respective screw eyes 16, 16, said screw eyes being located adjacent the smaller end of the hood member 13. Connected to the screw eyes 16, 16 are the respective coil springs 17, 17, and connected to the ends of the coil springs 17, 17 are the respective hooks 18, 18 adapted to engage around the hind legs of the animal 15 in the manner shown in Figure 1 to secure the animal in position for castration.

In using the device, the pig or the animal is placed in the hood member 13 with its back on the baseboard 12 and with its hind portion exposed through the larger end of the hood member 13, as illustrated in Figure 1. The hooks 18 are engaged around the hind legs of the animal,

2 thereby effectively securing the animal in proper position for castration. After the operation has been completed, the animal may be released by disengaging the hooks 18 from its hind legs and by withdrawing the animal from the hood 13.

From Figure 1 it will be apparent that the forward portion of the animal including the animal's front legs is received in the convergent portion of the hood member 13, and the animal is thus effectively restrained against moving during the process of castration.

While a specific embodiment of an improved animal-castrating holder has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal-castrating holder comprising a baseboard, a hood secured on said baseboard, said hood having a sloping top wall and being open at its larger end to receive an animal disposed with its back on said baseboard, and a pair of flexible retaining members secured to respective opposite sides of the forward portion of the holder and being arranged to engage the hind legs of the animal and exert forward force on said hind legs urging the legs toward the rear edge of said larger end.

2. An animal-castrating holder comprising a baseboard, a tunnel-like hood secured on said baseboard, said hood having a sloping top wall and being open at its larger end to receive an animal disposed with its back on said baseboard, a pair of coil springs connected to respective lower forward side portions of said hood, and a hook connected to the end of each coil spring, the hooks being arranged to engage the hind legs of the animal and exert forward force on said hind legs urging the legs toward the rear edge of said larger end.

JACK C. MILLER.

References Cited in the file of this patent

UNITED STATES PATENTS

| Number | Name | Date |
|---|---|---|
| 1,062,109 | Miller | May 20, 1913 |
| 1,451,826 | Hobbs | Apr. 17, 1923 |
| 2,188,024 | Van Meter | Jan. 23, 1940 |
| 2,484,088 | Hayes | Oct. 11, 1949 |